(12) United States Patent
Endo (10) Patent No.: US 7,805,569 B2
(45) Date of Patent: Sep. 28, 2010

(54) ELECTRONIC APPARATUS AND METHOD FOR DETECTING A STATE OF A REMOVABLE MEDIUM

(75) Inventor: Yoshinori Endo, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1135 days.

(21) Appl. No.: 11/065,125

(22) Filed: Feb. 24, 2005

(65) Prior Publication Data
US 2005/0193170 A1  Sep. 1, 2005

(30) Foreign Application Priority Data
Feb. 27, 2004 (JP) .............................. 2004-055228

(51) Int. Cl.
    *G06F 2/00* (2006.01)
(52) U.S. Cl. ....................... 711/115; 710/301; 710/302
(58) Field of Classification Search ................ 711/115; 710/301, 302; 713/202
    See application file for complete search history.

(56) References Cited

U.S. PATENT DOCUMENTS

| | | | |
|---|---|---|---|
| 6,381,405 B1 * | 4/2002 | Yamagishi | ................... 386/125 |
| 6,415,351 B1 | 7/2002 | Kobayashi et al. | |
| 7,123,296 B2 | 10/2006 | Misawa | |
| 7,200,694 B2 * | 4/2007 | Yakovlev et al. | ............... 710/48 |
| 2002/0032839 A1 * | 3/2002 | Yamamoto et al. | .......... 711/118 |
| 2003/0231343 A1 * | 12/2003 | Kobayashi et al. | ......... 358/1.16 |
| 2004/0037174 A1 * | 2/2004 | Uchida et al. | ............. 369/30.36 |

FOREIGN PATENT DOCUMENTS

| | | |
|---|---|---|
| JP | A 09-225115 | 9/1997 |
| JP | A-09-275557 | 10/1997 |
| JP | A-2000-222200 | 8/2000 |
| JP | A 2001-250324 | 9/2001 |
| JP | A 2002-073422 | 3/2002 |
| JP | A-2002-077471 | 3/2002 |
| JP | A 2002-203217 | 7/2002 |
| JP | A-2002-229664 | 8/2002 |
| JP | A 2002-354318 | 12/2002 |
| JP | A-2003-019848 | 1/2003 |
| JP | A 2004-015327 | 1/2004 |

* cited by examiner

Primary Examiner—Mardochee Chery
(74) Attorney, Agent, or Firm—Oliff & Berridge, PLC (57) ABSTRACT

A method and an apparatus for detecting a state of a removable medium installed in an electronic apparatus is provided. The electronic apparatus includes a detection device, a non-volatile storage device, a state change detection device, and a first notification device. The detection device detects a state of the removable medium and creates state data. The non-volatile storage device stores the state data. The state change detection device detects a change of the state of the removable medium by comparing state data stored during a first power-on period to state data stored during a second power-on period, where the first power-on period and the second power-on period are separated by a power-off period. The first notification device produces a first notification if the state change detection device detects the change of the state of the removable medium.

23 Claims, 11 Drawing Sheets

| CF PROTECTION FUNCTION | ON |
|---|---|
| BUZZER NOTIFICATION WHEN CF IS UNDER ABNORMAL CONDITIONS | ON |
| PRINT NOTIFICATION WHEN CF IS UNDER ABNORMAL CONDITIONS | ON |

FIG.9B

| DIMM PROTECTION FUNCTION | OFF |
|---|---|
| BUZZER NOTIFICATION WHEN DIMM IS UNDER ABNORMAL CONDITIONS | OFF |
| PRINT NOTIFICATION WHEN DIMM IS UNDER ABNORMAL CONDITIONS | OFF |

FIG.10

| CF CAPACITY | 64MB |
|---|---|
| DIMM CAPACITY | 128MB |

FIG.11A

```
              <Error print>

Error:  CompactFlash's capacity has changed.
Before: 128MB
After:  0 MB

To cancel the error, reset the ComapctFlash's
capacity or input administrator's password.
```

FIG.11B

```
              <Error print>

Error:  CompactFlash's capacity has changed.
Before: 128MB
After:  64 MB

To cancel the error, reset the ComapctFlash's
capacity or input administrator's password.
```

FIG.12A

| MEDIUM TO BE MONITORED | INFORMATION QUANTITY |
|---|---|
| CompactFlash(R) | 63MB |
| Memory Stick(R) | 120MB |
| SmartMedia(R) | 113MB |

FIG.12B

| MEDIUM TO BE MONITORED | IDENTIFIER INFORMATION |
|---|---|
| CompactFlash(R) | IDENTIFIER INFORMATION C |
| Memory Stick(R) | IDENTIFIER INFORMATION M |
| SmartMedia(R) | IDENTIFIER INFORMATION S |

ELECTRONIC APPARATUS AND METHOD FOR DETECTING A STATE OF A REMOVABLE MEDIUM

CROSS-REFERENCE TO RELATED APPLICATION

This application claims priority from JP 2004-055228, filed Feb. 27, 2004, the subject matter of which is incorporated herein by reference in its entirety.

BACKGROUND

Japanese Laid-Open Patent Publication No. 2002-229664 discloses a known technique for preventing unauthorized operations of an electronic apparatus. The technique employs a lock system that makes it impossible to remove removable media from the electronic apparatus unless a predetermined authorization procedure is followed. The predetermined authorization procedure may be a process that requires a password to remove the removable media.

The technique disclosed in the Japanese Laid-Open Patent Publication No. 2002-229664 may protect against unauthorized removal of removable media from an electronic apparatus, and thereby help prevent such removable media from being stolen. It is difficult, however, to avoid increases in cost, size, and complexity of such electronic apparatus if a mechanical lock system, such as the system disclosed in Japanese Laid-Open Patent Publication No. 2002-229664, is employed in order to prevent unauthorized removal of removable media.

SUMMARY

According to one aspect of the invention, an apparatus for detecting a state of a removable medium installed in the apparatus is provided. The electronic apparatus includes a detection device, a non-volatile storage device, a state change detection device, and a first notification device. The detection device detects a state of the removable medium and creates state data. The non-volatile storage device stores the state data. The state change detection device detects a change of the state of the removable medium by comparing state data stored during a first power-on period to state data stored during a second power-on period, where the first power-on period and the second power-on period are separated by a power-off period. The first notification device produces a first notification if the state change detection device detects the change of the state of the removable medium.

According to another aspect of the invention, a method for detecting a state of a removable medium installed in an electronic apparatus is provided. The method involves detecting a state of the removable medium and creating state data, storing the state data, detecting a change of the state of the removable medium by comparing state data stored during a first power-on period to state data stored during a second power-on period, where the first power-on period and the second power-on period are separated by a power-off period, and producing a first notification if the change of the state of the removable medium is detected.

According to another aspect of the invention, an electronic apparatus capable of receiving a removable medium is provided. The electronic apparatus includes a removal detection device, a notification device, and a prohibition setting device. The removal detection device detects whether the removable medium is removed from the electronic apparatus during a power-on period. The notification device produces a notification if the removable medium is removed from the electronic apparatus during the power-on period. The prohibition setting device prevents the notification device from producing the notification if a user inputs a prohibition instruction and the prohibition setting device will cease preventing the notification device from producing the notification if the user inputs a cancellation instruction.

According to another aspect of the invention, a method of detecting removal of a removable medium installed in an electronic apparatus is provided. The method involves detecting whether the removable medium is removed from the electronic apparatus during a power-on period, producing a notification if the removable medium is removed from the electronic apparatus during the power-on period, and detecting a notification instruction that is input by a user. If the user inputs a prohibition instruction, however, the notification is not produced. If the user inputs a cancellation instruction after inputting a prohibition instruction, however, the notification is produced.

BRIEF DESCRIPTION OF THE DRAWINGS

An embodiment of the invention will be described in detail with reference to the following figures, wherein.

DETAILED DESCRIPTION OF EXEMPLARY EMBODIMENTS

Throughout the following description, numerous specific concepts and structures are set forth in order to provide a thorough understanding of the invention. The invention can be practiced without utilizing all of these specific concepts and structures. In other instances, well known elements have not been shown or described in detail, so that emphasis can be focused on the invention.

A first embodiment of the invention will be described in detail with reference to the accompanying drawings.

Figure 1:
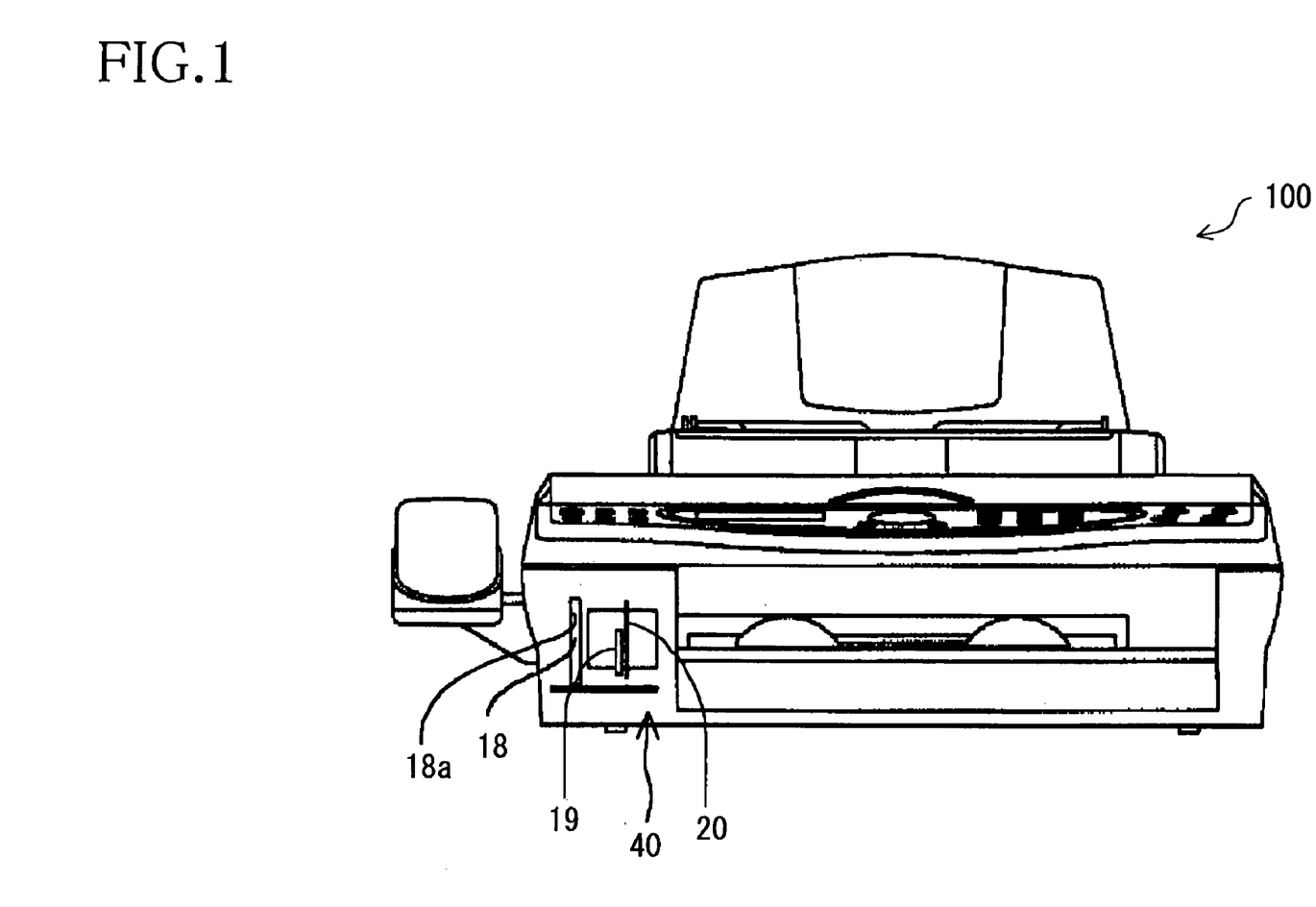
FIG. 1 is a front view of an exemplary image data processing apparatus provided as an example of an electronic apparatus employing one or more aspects of the invention.
Figure 2:
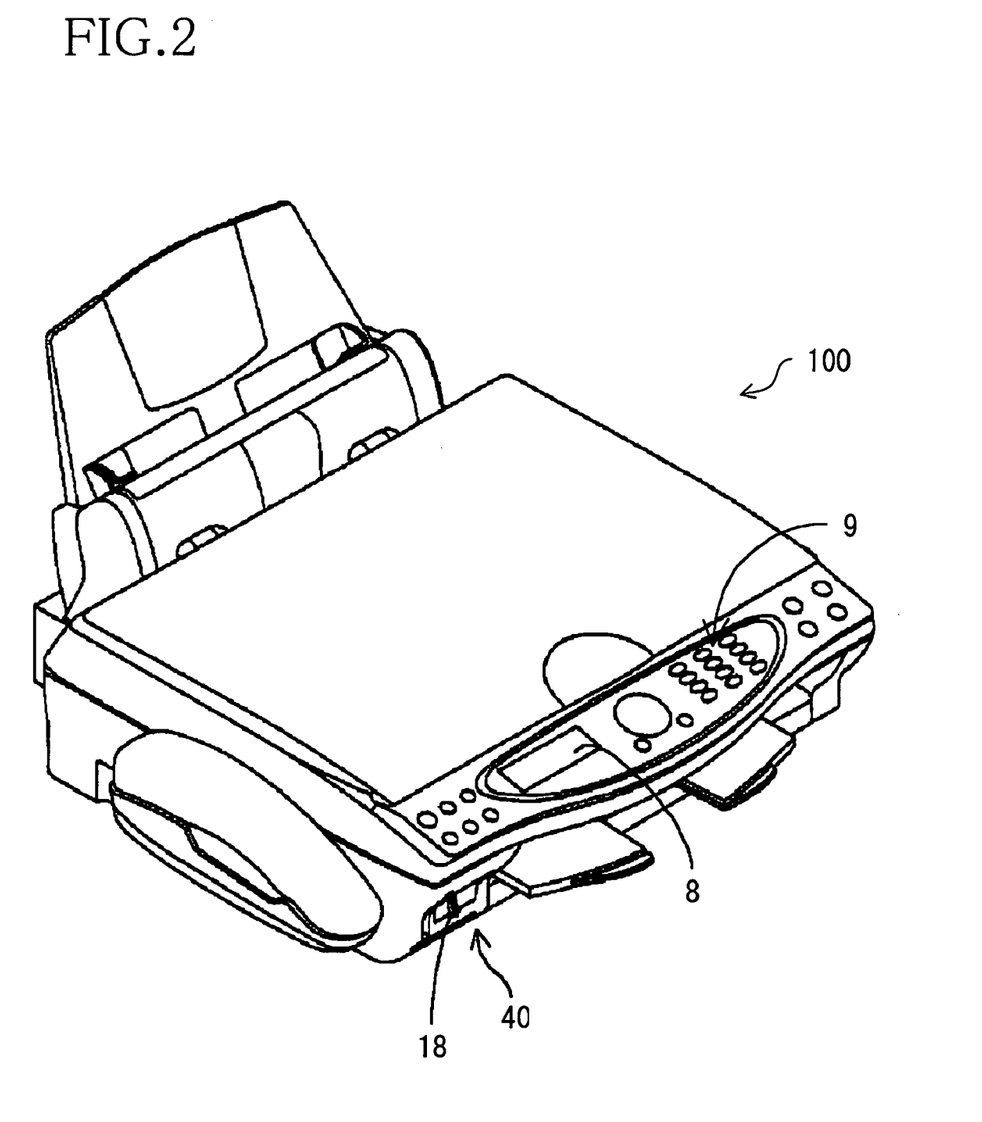
FIG. 2 is a perspective view of the image data processing apparatus shown in FIG. 1.
Figure 3:
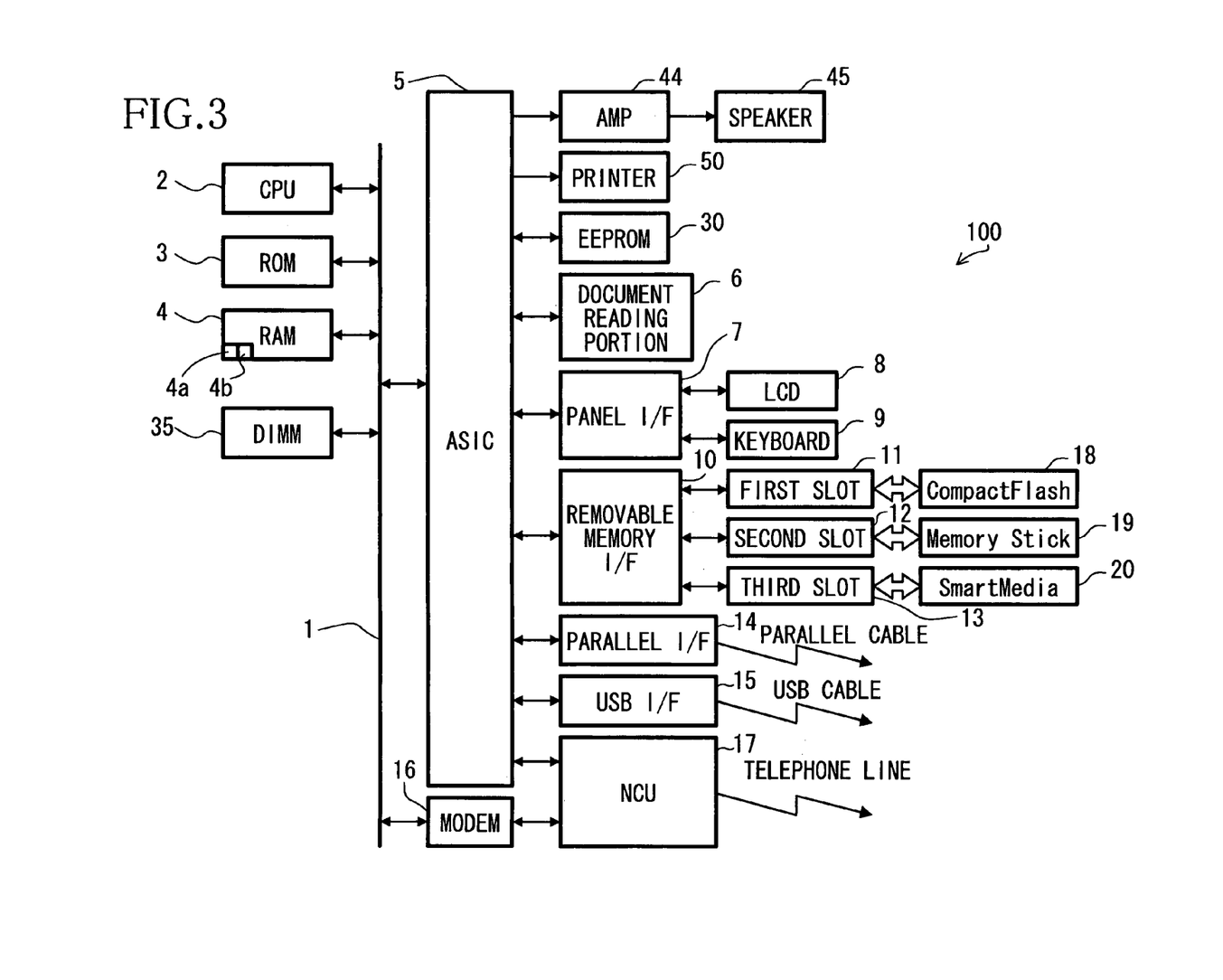
FIG. 3 is a block diagram showing a general electrical structure of the image data processing apparatus shown in FIG. 1.

As shown in FIGS. 1-3, an image data processing apparatus 100 may have various functions such as a telephone function, a facsimile function, a printer function, a copier function, and a scanner function. The image data processing apparatus 100 can carry out such functions standalone or, for example, in an environment connected to a personal computer (PC). An image data processing apparatus 100 may also be referred to as electronic apparatus and/or an image forming apparatus.

As shown in FIG. 3, in the image data processing apparatus 100, a central processing unit (CPU) 2 as a controller, a read only memory (ROM) 3, a random access memory (RAM) 4, an application specific integrated circuit (ASIC) 5, and a modem 16, which are used for storing control programs and data, are electrically connected via a bus 1. A dual inline memory module (DIMM) 35, as an extended RAM, is also detachably connected. The RAM 4 has a storing portion that functions as an internal memory 4a and a Nin1 flag storage area 4b in which a state of a Nin1 flag is set by a user. In the Nin1 flag storage area 4b, "1" is stored when a Nin1 flag is set to "on" by the user, and "0" is stored when the Nin1 flag is set to "off" by the user. The ASIC 5 is electrically connected to a document reading portion 6 for reading a document as image data, a panel interface 7, a removable memory interface 10, a parallel interface 14, a USB (universal serial bus) interface 15, and electrically erasable programmable read only memory (EEPROM) 30.

The document reading portion 6 is provided with an auto document feeder (ADF), so that original documents are fed, one at a time, to a reading point from a stack of pages. Documents, however, may also be read by manually placing each page on a glass where the reading point exists. The panel interface 7 is connected to a liquid crystal display (LCD) 8 for showing information to the user and a keyboard 9. The keyboard 9 receives instructions by the user. The removable memory interface 10 is connected to a first slot 11, a second slot 12, and a third slot 13. The first, second, and third slots 11, 12, 13 are designed to accept external memory, e.g., CompactFlash (a registered trademark of SanDisk) 18, Memory Stick (a registered trademark of Sony Corporation) 19, and SmartMedia (a registered trademark of Toshiba Corp.) 20, respectively.

In some embodiments, removable media and/or removable storage media may include, for example, one or more of a CompactFlash (hereinafter referred to as "CF") 18, a Memory Stick 19, a SmartMedia 20, and a DIMM 35. In some embodiments, other storage media such as a floppy disk, a magnetic optical disk (MO), a compact disc recordable (CD-R), a compact disc re-writable (CD-RW), a digital versatile disc recordable (DVD-R), a digital versatile disc random access memory (DVD-RAM), and a digital versatile disc re-writable (DVD-RW) may be used and, when such storage media are used, the slots 11 through 13 should be accordingly comprised of drives compatible with their requirements. Portions of the electronic apparatus other than the removable media may be referred to as an apparatus housing (i.e., non-removable media and/or non-media components).

The parallel interface 14 and the USB interface 15 can be connected to other electronic devices via a parallel cable and a USB cable respectively. The network control unit NCU 17 is electrically connected to the ASIC 5 and the modem 16. The NCU 17 is connected to a public telephone line. The ASIC 5 is connected to a speaker 45 via an amplifier 44. A printer 50 is connected to the ASIC 5. In some embodiments, the speaker 45, the printer 50 and the LCD 8 may together form a notification device.

Figure 4:
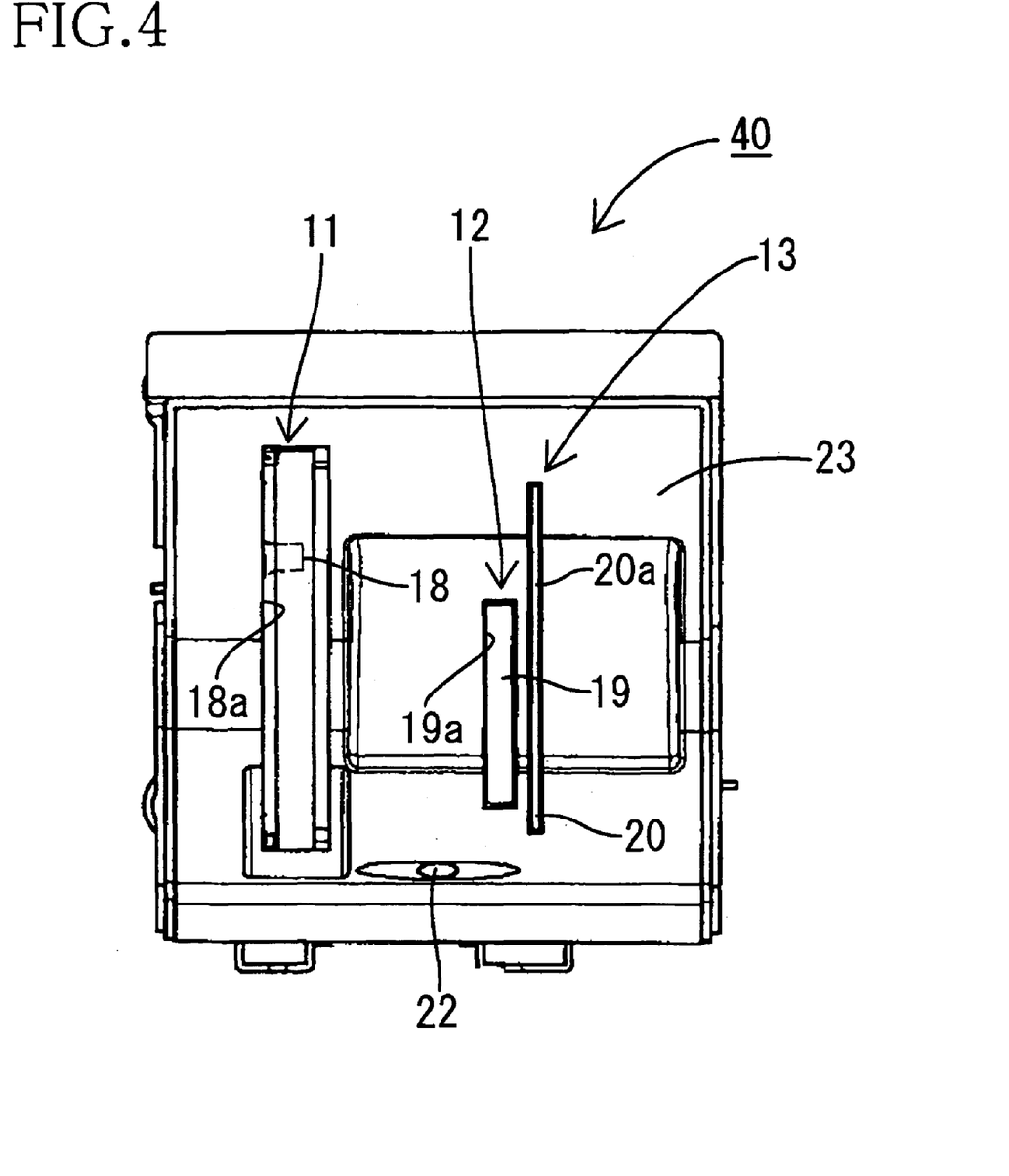
FIG. 4 is a front view showing an example of a media box for attaching an external memory.

As shown in FIGS. 1 and 2, in the exemplary embodiment, a media box 40 is disposed in a lower-left-front part of the image data processing apparatus 100, where, for ease of discussion, in the following description, the side of the image data processing apparatus 100 on which the LCD 8 and the keyboard 9 are provided will be referred to as the front side of the image data processing apparatus 100, and the side opposite to the front side will be referred to as the back side. In the exemplary embodiment illustrated in FIGS. 1 and 2, the media box 40 is embedded in the image data processing apparatus 100. As shown in FIG. 4, a media cover 23 is provided in the front of the media box 40, and the media cover 23 has a recessed shape which projects outward (frontward) from the front of the image processing apparatus 100. At the front of the media cover 23, in the exemplary embodiment, three card insertion slots 18a, 19a, 20a, which are vertically long and different in size, are arranged side by side. The largest slit 18a is used for inserting the CF 18. The smallest slit 19a is used for inserting the Memory Stick 19, which is thinner and smaller than the CF 18. The narrow slit 20a is used for inserting the SmartMedia 20. Substantially at a lower part of the slit 19a, an access lamp 22 that is an LED is disposed. The access lamp 22 is structured to turn on when the image data processing apparatus 100 accesses any one of the CF 18, the Memory Stick 19, and the SmartMedia 20. As shown in FIGS. 1, 2, and 4, the external memory such as the CF 18 is disposed such that it is partly exposed when inserted into the apparatus. That is, generally, an external memory is positioned within sight and at an easily accessible position.

A function for monitoring a removable medium will be described. The image data processing apparatus 100 includes a function for detecting whether a removable storage medium has been removed from the apparatus 100 and to provide some notification of the detected removal of the removable storage medium. In the following exemplary embodiment, the CF 18 and the DIMM 35 are the removable media that are targeted for detection. Specifically, the image data processing apparatus 100 stores the state of the removable medium, such as the CF 18 and the DIMM 35, in the EEPROM 30, detects whether the removable medium has been removed based on a comparison between the state stored in the EEPROM 30 and a state of the removable medium newly detected the previous state was stored in the EEPROM 30, and provides a notification to the user when removal of the removable medium has been detected. In other embodiments, the SmartMedia 19 or the Memory Stick 20 may, for example, be the targeted removable media for detection.

Figure 5:
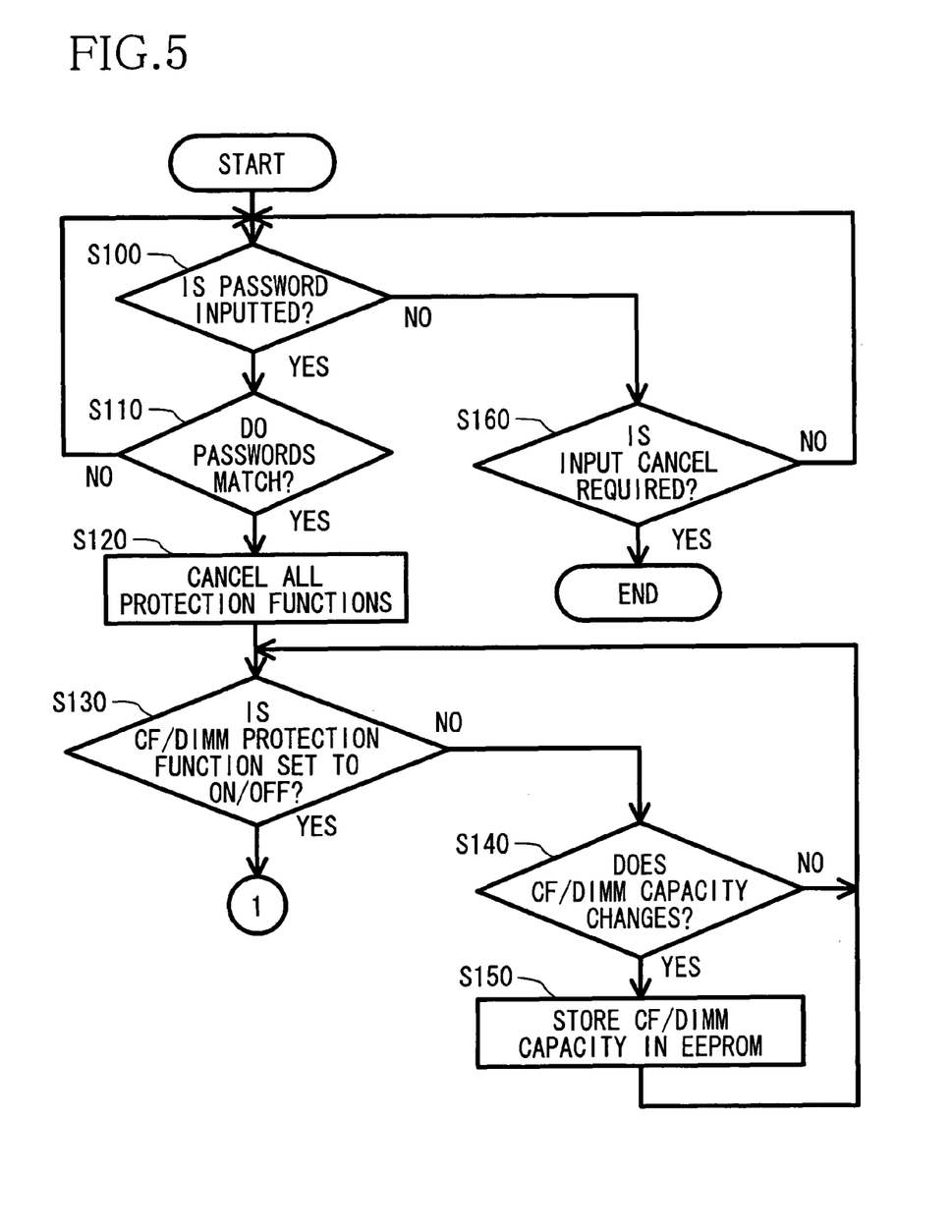
FIG. 5 is a flowchart of a first part of an exemplary setting process.
Figure 6:
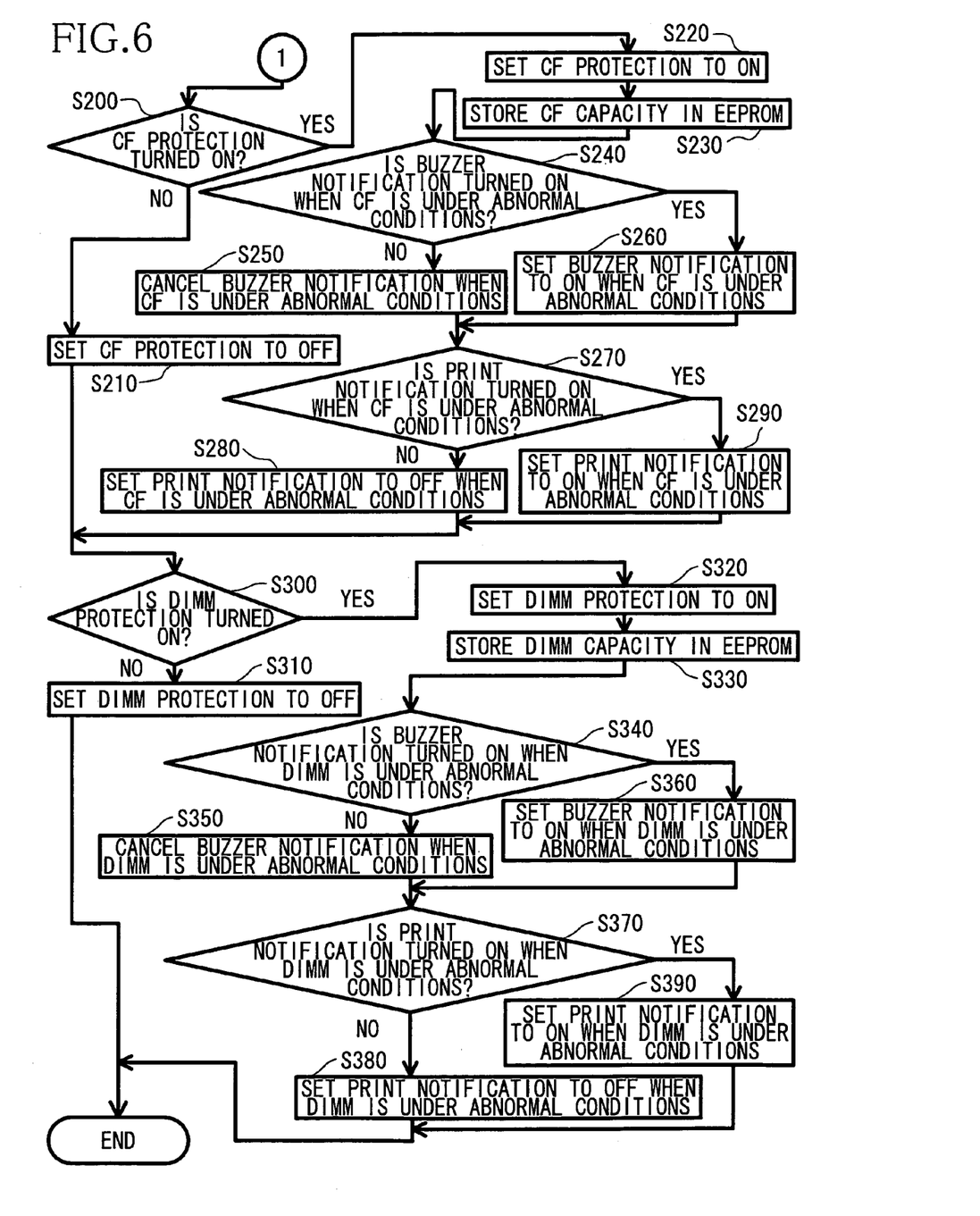
FIG. 6 is a flowchart of a second part of the setting process that continues from the end of the first part shown in FIG. 5.

An exemplary setting process will be described with reference to FIGS. 5 and 6. In particular, FIG. 5 is a flowchart of a first part of an exemplary setting process, and FIG. 6 is a flowchart of a second part of the setting process that continues from the end of the first part shown in FIG. 5.

The exemplary setting process is carried out when a change mode (a mode for changing settings) is set by an input from the keyboard 9. At S100, a determination is made as to whether a password is inputted. A setting change is carried out on condition that an authorized password has been inputted. If there is no password input (S100: No), a determination is made as to whether an input cancel is required at S160. If the input cancel is required (S160: Yes), the setting process ends. If the input cancel is not required (S160: No), the process flow goes to S100. At S100, when there is a password input (S100: Yes), a determination is made as to whether the inputted password is right at S110.

A password can be set and changed in another routine (not shown). As a set password is stored, for example, in the EEPROM 30, a determination is made as to whether the inputted password matches the password stored in the EEPROM 30. If the inputted password is does not match, i.e., is wrong (S110: No), the flow goes to S100 to redo the step of S100. On the other hand, when the inputted password matches the stored or set password (S110: Yes), all protection functions are cancelled at S120. The protection function is a function for monitoring a removable medium. A removable medium that does not apply to the protection function is not detected. At S130, a determination is made as to whether a change of a protection function for the CF 18 or DIMM 35 is directed. When it is determined that a change of the protection function for the removable media (e.g., CF 18 or DIMM 35) is not directed/ordered (S130: No), a determination is made as to whether there is a change in capacity of the removable media (e.g., CF 18 or DIMM 35 at S140).

When there is a change in capacity (S140: Yes), the capacity of the removable medium after the change is stored in the EEPROM 30 (S150). When there is no change in capacity (S140: No), the flow goes to S130. In this exemplary embodiment, going into S130, all the protection functions are cancelled based on the password verification at S110 and S120, and thus, as described below, no notification is made until a change in a setting of the protection function is directed/ordered at S130. That is, a prohibition setting is maintained until it is determined that a change in a setting of at least one of the protection functions or, in an embodiment with a single protection function, until a change in a setting of that protection function (i.e., at least one protection function is turned "on") has been made (S130: Yes). As long as the prohibition setting is maintained such that all protection functions are cancelled or off, even when the state of the removable medium is changed, no notification regarding the change in state or capacity is made by the notification device. In the description of the exemplary embodiments provided herein, a prohibition setting device may, for example, be a device which is capable of performing steps S120 and S130 and functions as a prohibition setting device that performs a prohibition setting based on information input by the user (herein, a password input).

Referring back to the exemplary setting process illustrated in FIG. 5, when it is determined that the change of the protection function for the removable media (e.g., CF 18 or the DIMM 35) is directed (S130: Yes), the process flow goes to S200 where a determination is made as to which of the removable media is to be monitored. That is, in cases involving more than one removable medium, the command for changing the protection function may refer to only one, some or all of the removable media, thus, at S200 the removable medium or media that has/have been targeted for monitoring is/are determined. In cases involving only one removable media, S200 may not be necessary. Thus, in this exemplary embodiment, in S200 it is determined whether the direction/command is to turn on the protection function (i.e. monitoring function) for the CF 18 and/or DIMM 35. In the exemplary embodiment, the protection function for at least one of the CF 18 and DIMM 35, which are removable media, can be turned on. That is, as discussed above, one or both of the CF 18 and DIMM 35, in this exemplary embodiment, may be targeted for monitoring.

When there is a direction/command to turn on the protection function for the CF 18 (that is, when the user inputs information to turn on the protection function), for example, the CF 18 designated as a target to be monitored is detected as to a change of a state whether the CF 18 has been removed or remains attached in a state change detection process, as will be described below, and when the change of the state is detected, a notification will be provided.

Figure 10:
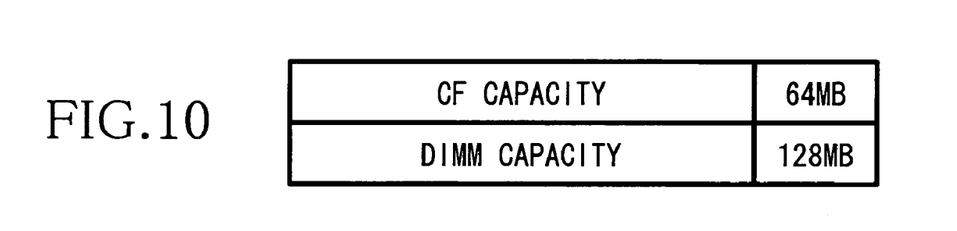
FIG. 10 shows an example of storage in an EEPROM.

In this case, the protection function for the CF 18 is directed to be turned on at S200 and the result at S200 is determined as positive. The process flow then proceeds to S220, where the protection function for the CF 18 is set to "on". In this case, at least the CF 18 of a plurality of removable media is targeted for monitoring, and more particularly, for targeting as to whether it is removed. At S230, the capacity of the CF 18 is detected and stored in the EEPROM 30. A device which is capable of performing the functions of step S230 may be referred to as a detection device. The EEPROM 30 is capable of storing each capacity as shown in FIG. 10.

On the other hand, when it is determined that there is no direction to turn on the protection function for the first removable media (e.g., CF 18) (S200: No), the protection function for the first removable media CF 18 is set or reset to "off" at S210. In this case, the first removable media CF 18 is not targeted for monitoring.

Referring back to the exemplary process flow in which at S220, the protection function for the first removable media CF 18, was set to "on", at S240, a determination is made as to whether a buzzer notification is to be made under abnormal conditions. When the buzzer notification is set to "on" (when the user inputs information to turn on the buzzer notification) (S240: Yes), setting information that the buzzer notification is turned on is stored. This setting information can be stored in the EEPROM 30, as shown, for example, in FIGS. 9A and 9B. On the other hand, when there is no direction to turn on the buzzer notification (S240: No), setting information corresponding to the buzzer notification being cancelled, or "off", is stored in the EEPROM 30 at S250.

Then, at S270, a determination is made as to whether a print notification is to be performed under abnormal conditions. When the print notification is directed (S270: Yes), print notification is turned on at S290, and associated setting information is stored in the EEPROM 30. Conversely, when the print notification is not directed (S270: No), setting information corresponding to the print notification being cancelled or "off" is stored in the EEPROM 30 at S280. In embodiments involving more than one removable medium, the process then proceeds to the next removable media and steps corresponding to steps S200 to S290 are performed with regard to the next removable media until, for example, all the removable media are addressed or at least all of the removable media selected by a user are addressed.

In various embodiments, the notification method may be in various forms (e.g., buzzer notification and print notification). When the form of the notification method is inputted/selected by the user through, for example, the keyboard 9 (FIG. 3), notification in accordance with the selected notification method is set. In some embodiments, a default notification method may be set.

As discussed above, the series of steps S300 to S390 corresponds to the series of steps S200 to S290, where steps S300 to S390 are performed to set the protection function and to select a notification method for the second removable medium (e.g., DIMM 35). The monitored object or removable medium in steps S200 to S290 is CF 18, while in steps S300 to S390, the monitored object or removable medium is DIMM 35. In both steps, similar determinations and settings are made. In general, during steps S200 to S390, each of the removable media (e.g., CF 18, DIMM 35) of the exemplary embodiment can be targeted for monitoring and, if the removable medium, for which processing is being performed, is set to be monitored, the notification method can be set.

Figure 7:
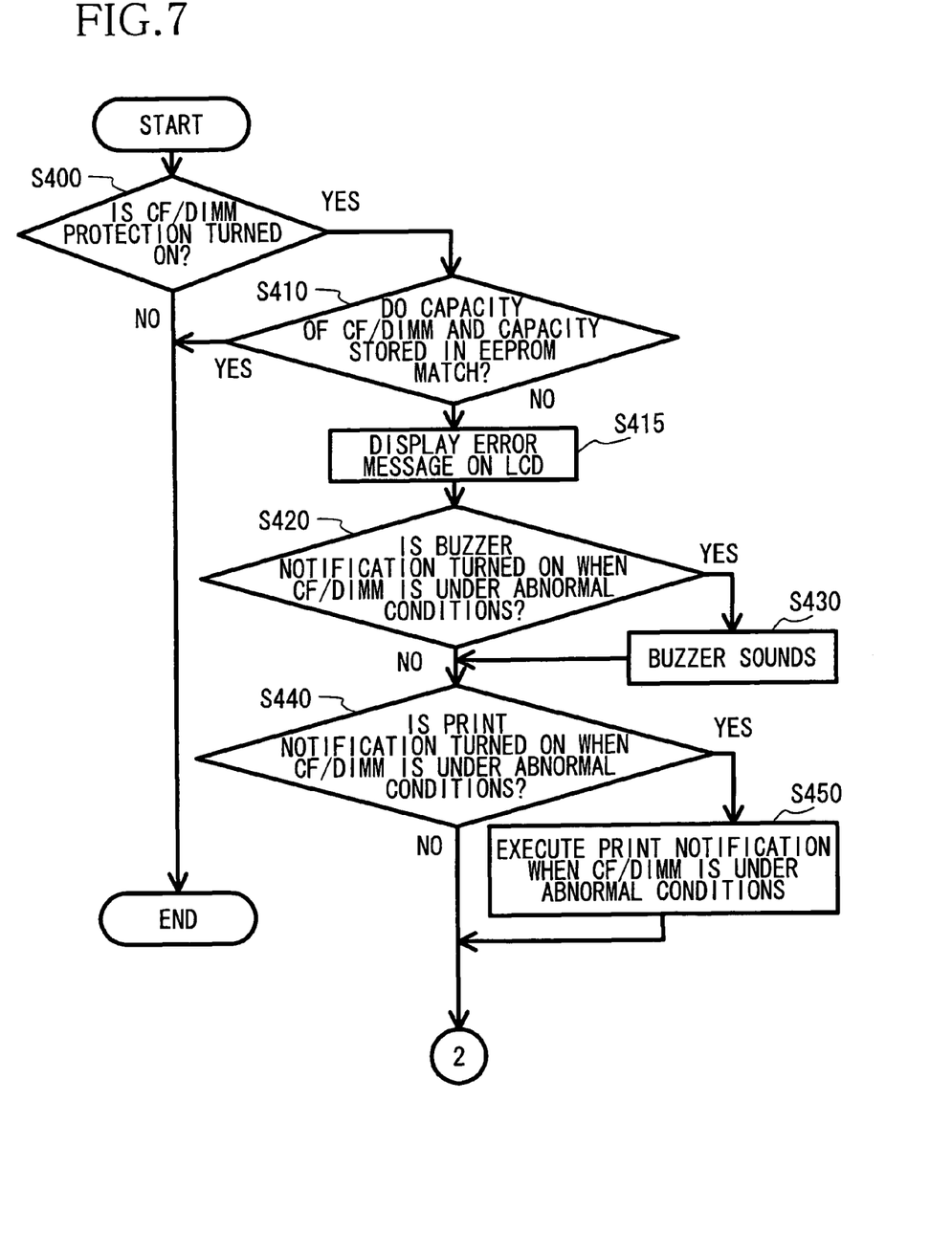
FIG. 7 is a flowchart of a first part of an exemplary state change detection process.
Figure 8:
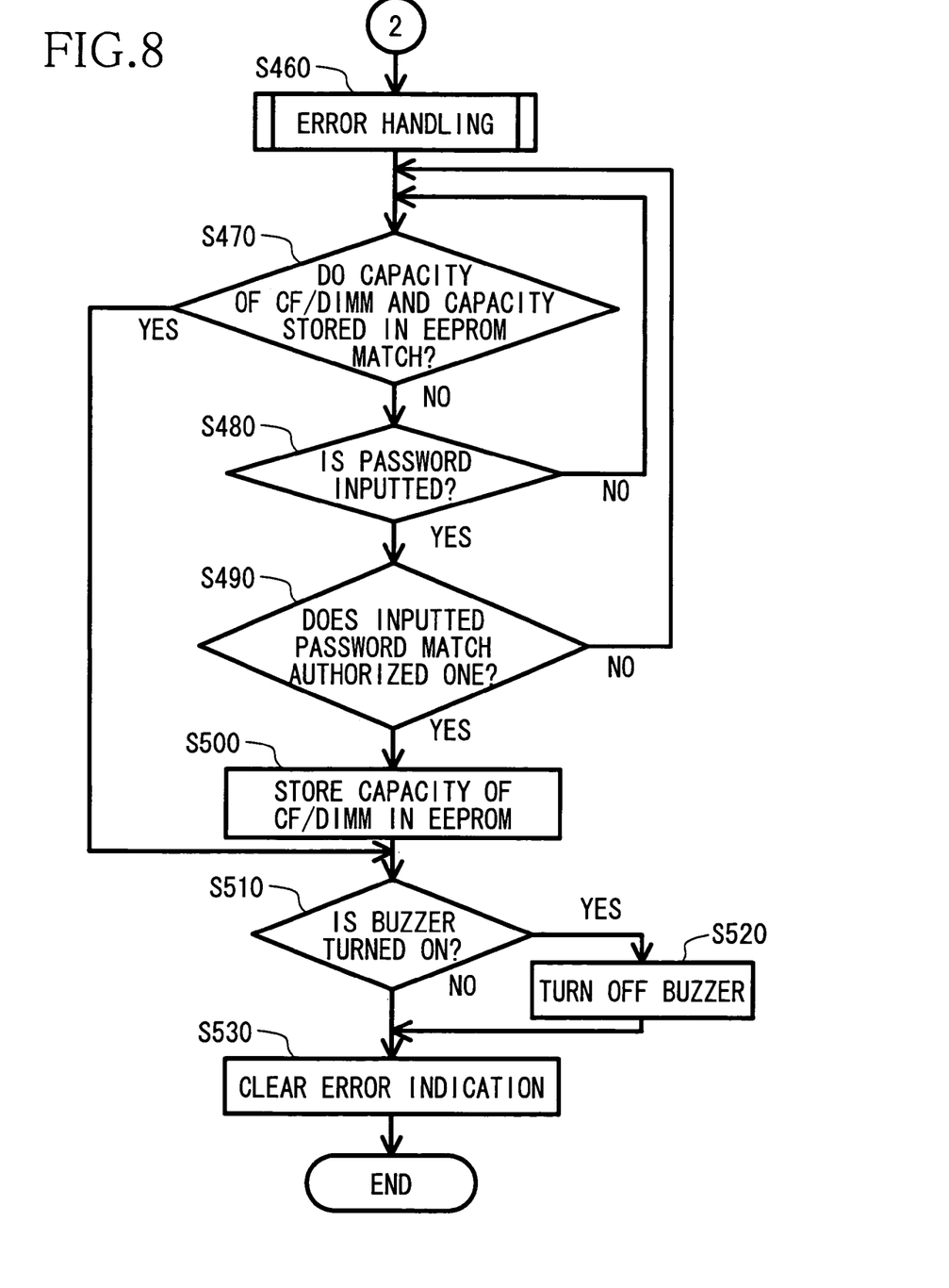
FIG. 8 is a flowchart of a second part of the state change detection process that continues from the first part shown in FIG. 7.

A state change detection process will be described with reference to FIGS. 7 and 8. In particular, FIG. 7 is a flowchart of a first part of an exemplary state change detection process, and FIG. 8 is a flowchart of a second part of the state change detection process that continues from the first part shown in FIG. 7.

In some embodiments, the state change detection process may be carried out when, for example, apparatus is powered-on. In some embodiments, the state change detection process may be carried out regularly or when a specified process requirement is met, while the power is turned on. The following description of an exemplary embodiment, will assume that the state change detection process is carried out when the power is turned on. In the state change detection process, a state change detection process for detecting a change of state of the CF 18 and a state change detection process to detect a change of state of the DIMM 35 are simultaneously carried out. In some embodiments, involving more than one removable medium, a state change detection process for each removable medium may be performed consecutively, while in other embodiments involving more than one removable medium, a state change detection process for the removable media may, for example, be formed in sub-groups (e.g., pairs) of the removable media. The flow chart illustrated in FIGS. 7 and 8 can apply to both of the state change detection processes (i.e., the state change detection process for detecting a change of state of the CF 18 and the state change detection process for detecting a change of state of the DIMM 35). In the exemplary flowcharts, although "CF/DIMM" is shown in conjunction with each other, "CF/DIMM" is used to show that CF 18 is selected in the state change detection process as to the CF 18 and DIMM 35 is selected in the state change detection process as to the DIMM 35.

As the state change detection process is performed as to CF 18 and DIMM 35 in a like manner, the following description will be made as to CF 18. At S400, a determination is made as to whether the protection function for CF 18 is turned on based on storage information corresponding to the state of the protection function for CF 18, as illustrated, for example, in FIG. 9A. When the protection function for CF 18 is not turned on, the CF 18 is not targeted for monitoring (S400: NO), and the state change detection process ends.

When the protection function for CF 18 is turned on (S400: YES), a determination is made as to whether the current capacity of CF 18 (that is, the capacity when the power is turned on) and the CF 18 capacity that is stored in the EEPROM 30 (that is, the capacity before the previously stored capacity; e.g., capacity stored before the power is turned off) match (S410). A device that is capable of performing S410 may be referred to as a state change detection device. When the previously stored capacity matches the current capacity (S410: YES), it is regarded that there is no state change, and the state change detection process ends.

Figure 9A:
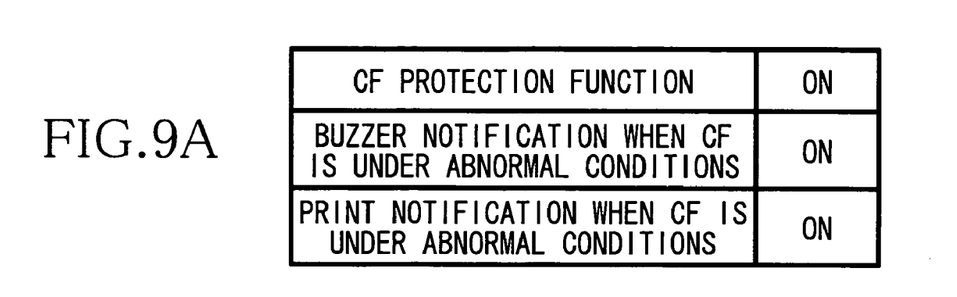
FIGS. 9A and 9B show examples of data structures for setting information.
Figure 9B:
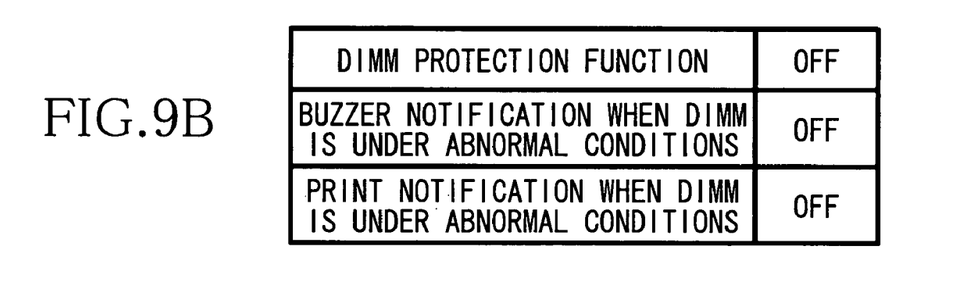

On the other hand, when the previously stored capacity does not match the current capacity for that removable medium (S410: No), an error message appears on the LCD 8 at S415, and it is determined at S420 whether a buzzer notification for the CF 18 under abnormal conditions is "on" based on the stored information about the state of the buzzer notification, as shown, for example, in FIG. 9A. When the buzzer notification for the CF 18 is set as "on" (S420: Yes), a buzzer sounds at S430. When the buzzer notification for the CF 18 is set as "off" (S420: No), a determination is made at S440 as to whether a print notification is "on" based on the stored information concerning the state of the print notification for that removable medium (FIG. 9A). When the print notification is "on" (S440: Yes), an error message that something is wrong with CF 18 is printed at S450. The amount of detail regarding the error that is provided/included in the error message may, in some embodiments, be set by the user.

Figure 11A:
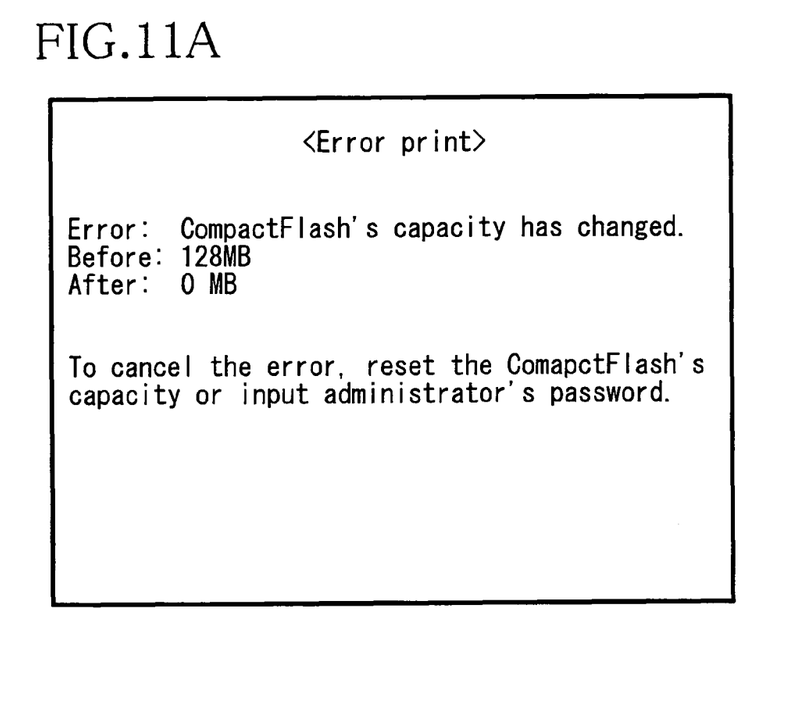
FIGS. 11A and 11B show examples of print notifications.
Figure 11B:
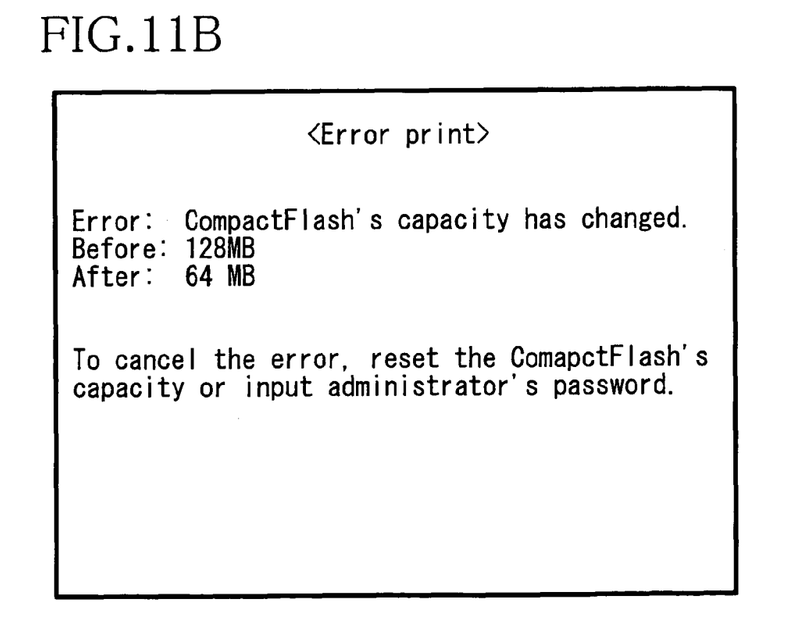

FIGS. 11A and 11B show exemplary error messages that may be provided. In the exemplary embodiment, a state change of the CF 18 is determined based on the capacity. Thus, for example, a print notification such as the exemplary error notification illustrated in FIG. 11B may be provided. In particular, in the exemplary printed error notification illustrated in FIG. 11B, information regarding the capacity of CF 18 before a state change of the CF 18 (that is, for example, the capacity of the CF 18 before the power is turned on) and information regarding the capacity of CF 18 after the state change (that is, the capacity of the CF 18 when the power is turned on) are printed to inform the user of the change in detail.

In some embodiments, when a removable medium targeted for monitoring is removed, error information, such as the exemplary error information, shown in FIG. 11A may be printed. In some embodiments, when the removable medium is exchanged or replaced, due to a change in capacity or removal of the removable medium (i.e., capacity decreases to zero when a removable medium is removed), for example, the error information shown in FIG. 11B may be printed. Such printed error messages enable the user to know the current state in detail, and help the user address/solve the problem. Such printed error messages may also indicate a method for clearing the notification as well as the error message itself. When the print notification is not turned on (S440: No), printing is not performed. At S460 of FIG. 8, error handling (displaying an error message) is performed to notify the user of an error visually.

Further, in the exemplary embodiment, when a removable medium is returned to the state in which it was in before the state change giving rise to the error notification, the notification is stopped. In addition, in the exemplary embodiment, when the user cancels or turns "off" the error notification during the notification, the notification is stopped. In particular, in the exemplary embodiment, at S470, the determination is again made as to whether the current capacity of CF 18 matches the previously stored capacity of CF (i.e., state of capacity of CF before the detected state change), which is stored in the EEPROM 30. If it is determined that the current capacity matches the previously stored capacity (or default/initiated capacity) (S470: Yes), it is assumed that the state of CF 18 is restored and a determination is made as to whether the buzzer is set to "on" is made at S510. When it is determined that the buzzer is set as "on" (S510: Yes), it is turned off at S520, and the error indication is cleared at S530. When the buzzer is already set to "off" and the buzzer does not sound (S510: No), the error indication is cleared at S530.

If, however, the capacity of CF 18 does not match the capacity stored in the EEPROM 30 (S470: No), it is determined whether a password has been input at S480. When there is no password input (S480: No), the flow goes back to S470. When there is a password input (S480: Yes), it is determined whether the inputted password matches the authorized one (S490). When they match (S490: Yes), the current capacity of CF 18 is newly stored in the EEPROM 30 at S500, and the notification is cleared, by turning off the buzzer at S520 and by clearing the error indication at S530. In this manner, the change of state of CF 18 may be detected and, if necessary, error notification may be handled if, for example, a change is detected in the capacity of CF 18 and/or if CF 18 is removed.

In the exemplary embodiment described above, when the setting process is performed, the state change detection process shown in FIGS. 7 and 8 is performed when the power of the electronic apparatus is turned on. In some embodiments, the state change detection process may be performed at specified intervals (e.g. at every second) while the power is turned on. For example, in the exemplary embodiment, when it is determined whether the removable medium (e.g., CF 18 or the DIMM 35) has been removed from the apparatus while the power is turned on, and when it is determined that CF 18 or DIMM 35 has been removed, notification is made. In the exemplary embodiment, the change of state of CF 18 and DIMM 35 is detected by comparing the capacity of CF 18 or DIMM 35 before the power is turned off and the capacity of CF 18 or DIMM 35 after the power is turned on.

Referring back to the exemplary flowchart illustrated in FIGS. 5 and 6, at S230 and S330 of the exemplary setting process, the capacity of CF 18 or DIMM 35 is stored in the EEPROM 30, the state change detection process is performed at regular intervals (e.g. at every second), and then the capacity is compared with the one regularly stored in the EEPROM 30, so that the state change detection process can be performed with the power turned on. A device which is capable of performing the functions of S410 may be referred to as an on-state change detection device, if it only performs the function of steps S410 when the power is "on" or simply as a state change detection device if it performs the functions based on a set or default condition.

In the exemplary embodiment described above, even in a case where all the protection functions are cancelled at S120 and the protection function for any removable medium is not directed at S130, the prohibition setting is maintained. A device that is capable of performing the functions of steps S120 and S130 may be referred to as an on-state prohibition setting device or a prohibition setting device. When the prohibition setting is made, no notification is made even if the removable medium/media (e.g., CF 18 or the DIMM 35) has been removed from the image data processing apparatus 100 while the power is turned on. When the prohibition setting is cancelled, in other words, when the protection function is turned on at S220 or S320, notification is made when the removable medium has been removed.

Although the invention has been described with reference to an exemplary embodiment, the description of the exemplary embodiment is illustrative only and is not to be construed as limiting the scope. Various other modifications and changes may occur to those skilled in the art without departing from the spirit and scope of the description.

Figure 12A:
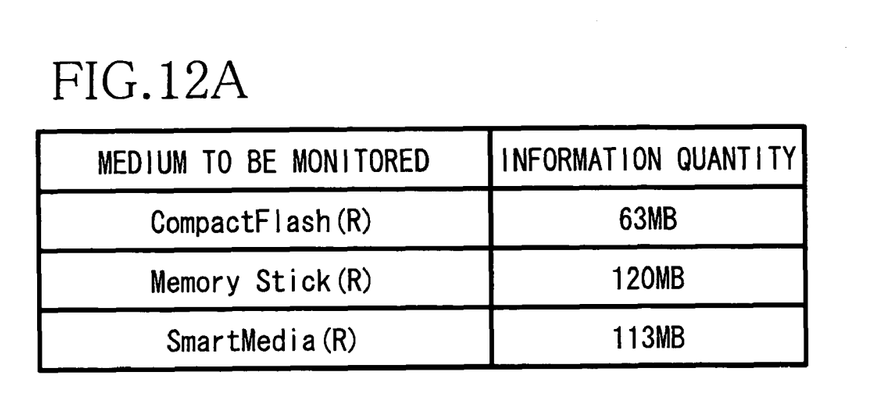
FIG. 12A shows a storage structure for storing information quantity.

In the above exemplary embodiment, the state change detection is made based on the change of the capacity of the targeted removable medium. However, it is not limited to such a structure. For example, when a removable medium is, for example, CF 18 of which stored information is maintained in the EEPROM 30 even after power shutdown, the information quantity for information stored before the power is turned off may be stored, the information quantity for information to be stored by the removable storage medium after the power is turned on may be detected, and a change of state may be detected based on a result of detection after the power is turned on and the information quantity stored in the EEPROM 30. FIG. 12A conceptually shows a structure of storing information quantities for media of which stored information is retained even after power is shutdown. For example, the information quantity of CF 18 stored in the EEPROM 30 before the power is turned off is 63 megabytes (MB) as shown in FIG. 12A. The change of state of the CF 18 can be detected by determining whether the information quantity after the power is turned on is still 63 MB. The method to detect a change of state of a removable storage medium based on the information quantity is not, however, limited to the state change detection at power-up. This method is also applicable for detecting removal of the removable storage medium while the power is turned on.

Figure 12B:
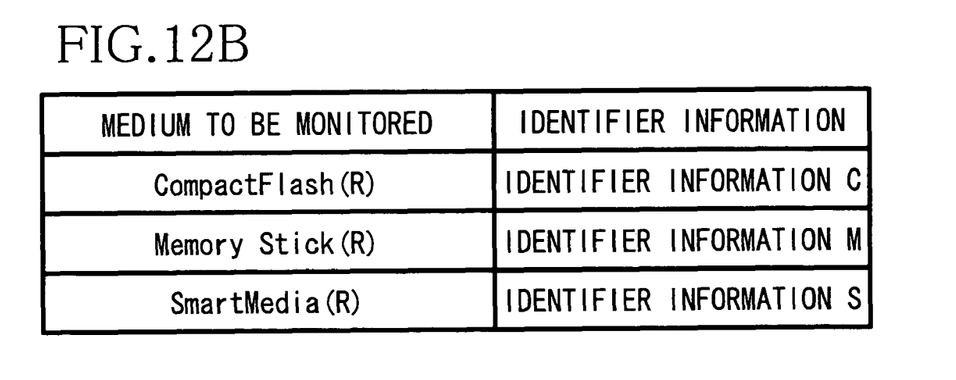
FIG. 12B shows a storage structure for storing identifier information.

In the exemplary embodiment described above, the state change detection is made based on the change of the capacity of the targeted removable medium. However, it is not limited to such a structure. When a removable medium is, for example, CF 18 of which stored information is maintained in the EEPROM 30 even after power shutdown, the identifier information stored in the CF 18 may be stored in the EEPROM 30. FIG. 12B conceptually shows a structure of identifier information stored before the power is turned off. For example, data of a specified address of the CF 18 may be detected and stored as identifier information C in the EEPROM 30 before the power is turned off. After the power is turned on, the data of the specified address of the CF 18 is detected and determined whether it is identical with the identifier information C. In this manner, detection of whether the state of the CF 18 is consistent before and after the power is turned off can be made accurately. The method to detect a change of state of a removable storage medium based on the identifier information is not limited to the state change detection at power-up. This method is also applicable for detecting removal of the removable storage medium while the power is turned on.

The setting information of the protection functions, the buzzer notification, and the print notification may be performed, for example, through the keyboard 9 provided in the image data processing apparatus 100 and a computer connected with the image data processing apparatus 100 via a LAN cable or a dedicated cable.

In the above exemplary embodiment, the EEPROM 30 stores the content stored in CF 18 or DIMM 35 and the information quantity of CF 18 or DIMM 35. However, it may just store presence/absence information as to whether the removable medium is attached. In this case, notification can be made when it is detected that a removable medium that should be attached has been removed based on the presence/absence information.

In the above exemplary embodiment, a removable storage medium such as CF 18 and DIMM 35 is taken as one example of removable media. However, it may be a board having various functions, such as a network board. It is especially effective when a monitored object is a removable medium, which can be widely used in various apparatuses (e.g., an image data processing apparatus, an image forming apparatus such as a printer, and a personal computer).

In the above exemplary embodiment, the EEPROM 30 is taken as one example of a nonvolatile state storage device. However, other non-volatile memory, such as PROM, EPROM, an optical ROM disk, such as a CD-ROM or DVD ROM, and disk drive, flash memory or other alterable memory, as indicated above, or the like may be used. When notification is unnecessary, for example, when an administrator removes a removal medium with the power turned off, it is possible to cancel notification by the notification device.

In some embodiments, a user may be notified of a change in a state of a removable medium while the power is turned on and/or when the power is turned off.

In some embodiments, it is possible to cancel error notification, by a notification device, while the power is turned on even if there is a change of a state of a removable medium. For example, when an administrator, with authorization, removes a removal medium with the power turned on.

In some embodiments, the user can appropriately select a removable medium targeted for monitoring and a removable medium not targeted for monitoring. As a result, a removable medium that the user needs and/or desires to monitor can be monitored effectively.

In some embodiments, the user can select a desired notification method.

In some embodiments, a user can know how a state of a removable medium has been changed and how to react when unauthorized removal of the removable medium occurs.

In some embodiments, notification can be stopped with a simple operation, such as the user returning the removed removable medium to its authorized state. Thus, if the user removes a removal medium from the electronic apparatus accidentally, the user can stop notification simply without complicated operations.

As a removable storage medium can be the subject of unauthorized removal, if it is stolen, information stored in the medium is lost as well as the medium, which generally results in an increased economic loss. With the above structure, such an unauthorized removal can be detected immediately, and resulting damage can be effectively prevented. The positional state of the removable storage medium can be detected based on the information quantity. Even if the removable storage medium is replaced, without authorization, with a removable storage medium of the same sort, the identity of the removable storage medium can be determined based on the information quantity, so that the positional state of the removable storage medium can be very precisely determined.

In some embodiments, the positional state of a removable storage medium can be detected based on a change in identifier information. Even if the removable storage medium is replaced, without authorization, with a removable storage medium of the same sort, the identity of the removable storage medium can be determined based on the identifier information, so that the positional state of the removable storage medium can be very precisely determined. For an electronic apparatus where the removable medium is attached to the apparatus housing so that it can be seen and accessed by authorized users, while it is convenient from a usability standpoint, it is subject to unauthorized removal. However, as one or more aspects of the invention described above can applied to the electronic apparatus, such unauthorized removal can be effectively monitored, and preferably prevented.

What is claimed is:

1. An image forming apparatus configured to receive a removable medium, the image forming apparatus comprising:
   a detection device that detects a state of the removable medium and creates state data;
   a non-volatile storage device that stores the state data; a state change detection device that detects a change of the state of the removable medium by comparing state data stored during a first power-on period of the image forming apparatus to state data stored during a second power-on period of the image forming apparatus, the first power-on period and the second power-on period being separated by a power-off period of the image forming apparatus; and
   a first notification device that produces a first notification if the state change detection device detects the change of the state of the removable medium;
   wherein:
   the removable medium is a removable storage medium and the state of the removable medium is at least one of a capacity of the removable storage medium, a quantity of data on the removable storage medium and identifier information on the removable storage medium;
   the image forming apparatus is configured to receive a plurality of removable media, wherein a user identifies whether each of the media is a monitored object or not a monitored object, and the image forming apparatus is configured to determine whether one, some, or all of the media has been identified by a user as the monitored object;
   the state change detection device detects the change of a state of at least one of the plurality of removable media, which a user has identified as a monitored object; and
   the first notification device producing the first notification when the change of the state of the at least one of the plurality of removable media identified as the monitored object is detected by the state change detection device.

2. The image forming apparatus of claim 1, further comprising a first prohibition setting device that prevents the first notification device from producing the first notification if a user inputs a first prohibition instruction, wherein the first prohibition setting device will cease preventing the first notification device from producing the first notification if the user inputs a first cancellation instruction.

3. The image forming apparatus of claim 2, further comprising:
   a removal detection device that detects whether the removable medium is removed from the image forming apparatus during a power-on period; and
   a second notification device that produces a second notification if the removable medium is removed from the image forming apparatus during the power-on period.

4. The image forming apparatus of claim 3, further comprising a second prohibition setting device that prevents the second notification device from producing the second notification if a user inputs a second prohibition instruction, wherein the second prohibition setting device will cease preventing the second notification device from producing the second notification if the user inputs a second cancellation instruction.

5. The image forming apparatus of claim 1, wherein:
   the first notification device is capable of producing the first notification by a plurality of notification methods; and
   the first notification device makes the first notification by at least one notification method identified by a user.

6. The image forming apparatus of claim 1, wherein the first notification includes information relating to the change of the state of the removable medium.

7. The image forming apparatus of claim 6, wherein the information includes pre-change information relating to a state of the removable medium before the change of the state and post-change information relating to a state of the removable medium after the change of the state.

8. The image forming apparatus of claim 1, wherein if, during the first notification, the removable medium returns to a state equivalent to a state detected immediately preceding the detected change of the state, the first notification ceases.

9. The image forming apparatus of claim 1, wherein the removable medium is a removable storage medium detachably attached to a housing of the image forming apparatus, such that the removable medium is partly exposed when attached to the apparatus housing.

10. The image forming apparatus of claim 9, wherein:
    the detection device detects a quantity of data stored on the removable storage medium;
    the non-volatile storage device stores the detected quantity; and
    the state change detection device detects a change of the state of the removable medium by comparing a quantity of stored data from a first power-on period to a quantity of stored data from a second power-on period.

11. The image forming apparatus of claim 9, wherein:
    the detection device detects identifier information stored on the removable storage medium;

the non-volatile storage device stores the identifier information; and the state change detection device detects a change of the state of the removable medium by comparing identifier information from a first power-on period to identifier information from a second power-on period.

12. The image forming apparatus of claim 1, wherein the image forming apparatus is an image data processing apparatus provided with an image forming device.

13. A method for detecting a state of a removable medium installed in an image forming apparatus, the method comprising:

detecting a state of the removable medium and creating state data; storing the state data; detecting a change of the state of the removable medium by comparing state data stored during a first power-on period of the image forming apparatus to state data stored during a second power-on period of the image forming apparatus, the first power-on period and the second power-on period being separated by a power-off period of the image forming apparatus; and producing a first notification if the change of the state of the removable medium is detected;

wherein:

the removable medium is a removable storage medium and the state of the removable medium is at least one of a capacity of the removable storage medium, a quantity of data on the removable storage medium and identifier information on the removable storage medium;

the image forming apparatus is configured to receive a plurality of removable media, wherein a user identifies whether each of the media is a monitored object or not a monitored object, and the image forming apparatus is configured to determine whether one, some, or all of the media has been identified by a user as the monitored object;

detecting the change of the state comprises detecting a change of a state of at least one of a plurality the plurality of the removable media inserted into the image forming apparatus, which a user has identified as a monitored object; and producing the first notification comprises producing the first notification when the change of the state of the at least one of the plurality of removable media identified as the monitored object is detected.

14. The method of claim 13, further comprising:

preventing the first notification from being produced if a user inputs a first prohibition instruction; and ceasing preventing the first notification from being produced if the user inputs a first cancellation instruction.

15. The method of claim 13, further comprising:

detecting whether the removable medium is removed from the image forming apparatus during a power-on period; and producing a second notification if the removable medium is removed from the image forming apparatus during the power-on period.

16. The method of claim 15, further comprising:

preventing the second notification from being produced if a user inputs a second prohibition instruction; and ceasing preventing the second notification from being produced if the user inputs a second cancellation instruction.

17. The method of claim 13, wherein producing the first notification comprises producing a notification including information relating to the change of the state of the removable medium.

18. The method of claim 17, wherein the information includes pre-change information relating to a state of the removable medium before the change of the state and post-change information relating to a state of the removable medium after the change of the state.

19. The method of claim 13, wherein if, while producing the first notification, the removable medium returns to a state equivalent to a state detected immediately preceding the detected change of the state, producing the first notification is ceased.

20. The method of claim 13, wherein:

detecting the state of the removable medium comprises detecting a quantity of data stored on the removable medium;

storing the state data comprises storing the detected quantity; and detecting the change of the state comprises comparing a quantity of stored data from a first power-on period to a quantity of stored data from a second power-on period.

21. The method of claim 20, wherein:

detecting the state of the removable medium comprises detecting identifier information stored on the removable medium;

storing the state data comprises storing the identifier information; and detecting the change of the state comprises comparing identifier information from a first power-on period to identifier information from a second power-on period.

22. An image forming apparatus configured to receive a removable medium, the image forming apparatus comprising:

a removal detection device that detects whether the removable medium is removed from the image forming apparatus during a power-on period of the image forming apparatus;

a first notification device that produces a first notification if the removable medium is removed from the image forming apparatus during the power-on period;

a prohibition setting device that prevents the first notification device from producing the first notification if a user inputs a prohibition instruction, wherein the image forming apparatus is configured to receive a plurality of removable media, wherein a user identifies whether each of the media is a monitored object or not a monitored object, and the image forming apparatus is configured to determine whether one, some, or all of the media has been identified by a user as the monitored object;

a state change detection device that detects the change of a state of at least one of a the plurality of the removable media inserted into the mage forming apparatus that a user has identified as a monitored object; and a second notification device that produces a second notification when the change of the state of the at least one of the plurality of removable media identified as the monitored object is detected by the state change detection device;

wherein the prohibition setting device will cease preventing the first notification device from producing the first notification if the user inputs a cancellation instruction.

23. A method of detecting removal of one of a plurality of removable medium installed in an image forming apparatus, the image forming apparatus being configured to receive a plurality of removable media, wherein a user identifies whether each of the media is a monitored object or not a monitored object, and the image forming apparatus being configured to determine whether one, some, or all of the media has been identified by the user as the monitored object, the method comprising:

detecting a change of a state of the one of the plurality of removable media that the user has identified as a monitored object;

producing a first notification when the change of the state of the one of the plurality of removable media identified as the monitored object is detected; detecting whether the one of the plurality of the removable medium is removed from the image forming apparatus during a power-on period of the image forming apparatus;

producing a second notification if the one of the plurality of the removable medium is removed from the image forming apparatus during the power-on period; and detecting a notification instruction input by the user; wherein:

if the user inputs a prohibition instruction, the second notification is not produced, and     if the user subsequently inputs a cancellation instruction, the second notification is produced.

\* \* \* \* \*